United States Patent Office 3,549,977
Patented Dec. 22, 1970

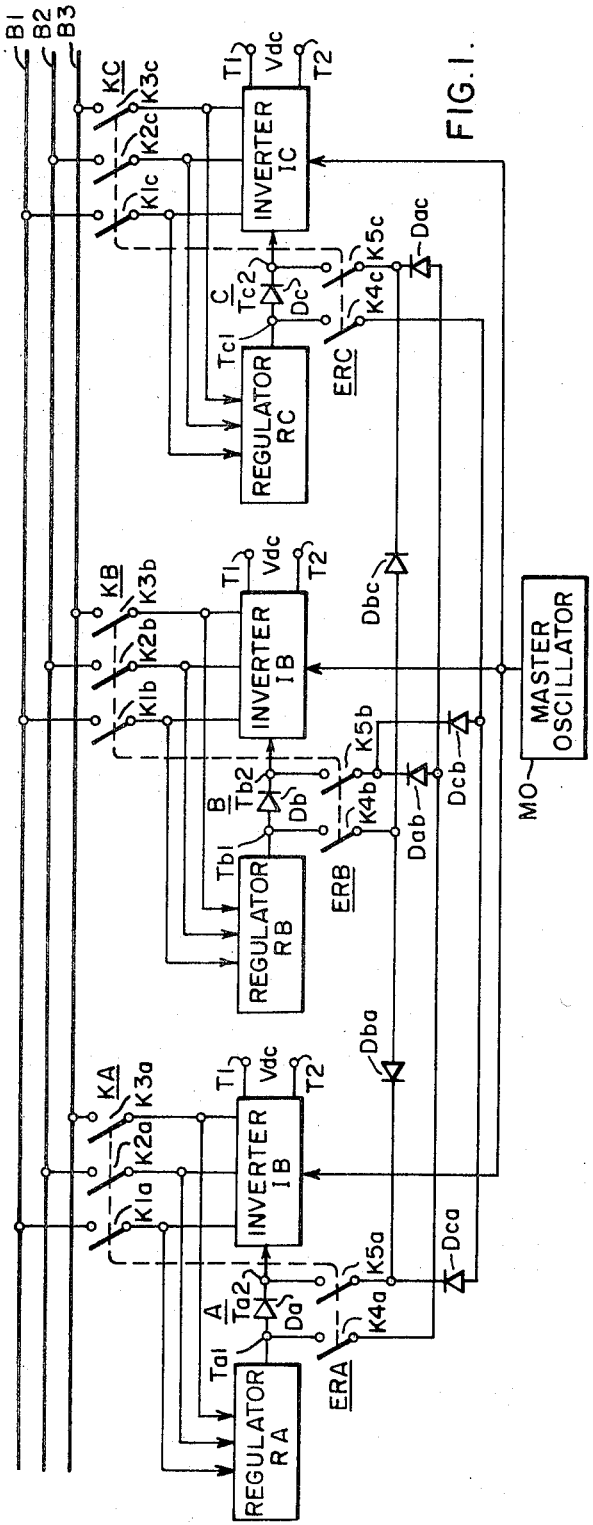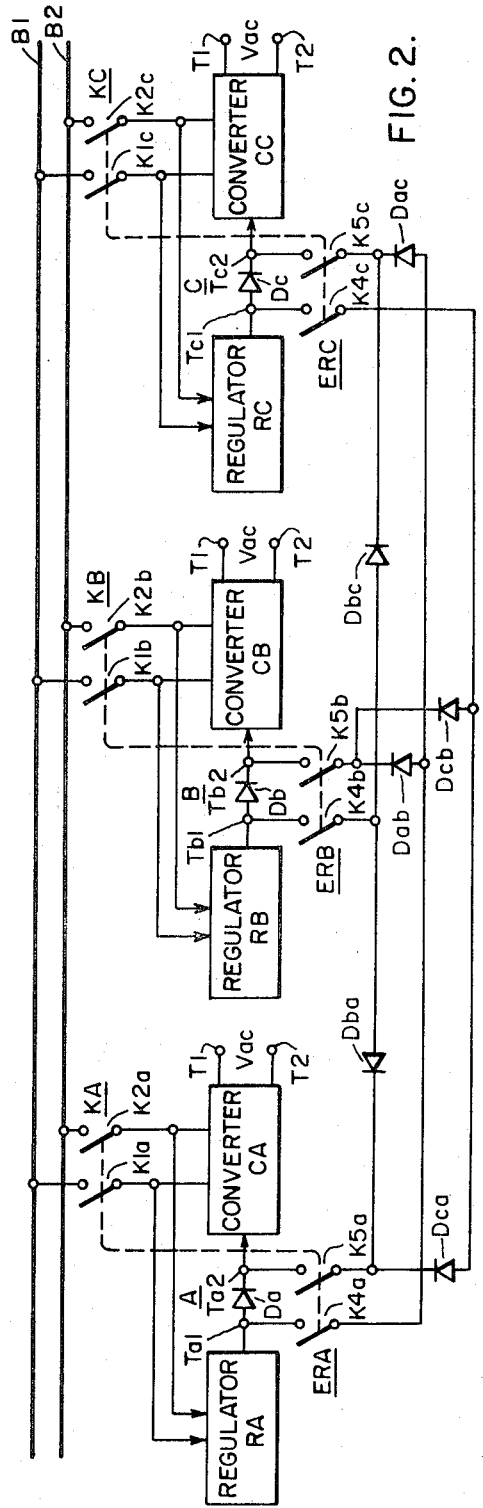

1

3,549,977
POWER PROCESSING SYSTEM EMPLOYING A PLURALITY OF PROCESSING UNITS HAVING PARALLEL CONNECTED OUTPUTS
Kenneth M. Watkins, Williamsville, N.Y., assignor to Westinghouse Electric Corporation, Pittsburgh, Pa., a corporation of Pennsylvania
Filed Nov. 13, 1968, Ser. No. 775,387
Int. Cl. H02j 3/38
U.S. Cl. 321—18
6 Claims

ABSTRACT OF THE DISCLOSURE

A power processing system is disclosed wherein a plurality of processing units, such as converters or inverters, are connected to supply a common output. A regulator is provided for each of the processing units and supplies regulating control signals in response to the output of the associated unit. An error restrictor is provided which supplies the regulating control signals corresponding to the highest output of a particular unit to each of the units and blocks regulating control signals from the other of the regulators from being applied to the processing units.

BACKGROUND OF THE INVENTION

Field of the invention

The present invention relates to power processing systems and, more particularly, to such systems wherein a plurality of outputs are applied to a common output.

Discussion of the prior art

In many applications it is highly desirable to be able to parallel the outputs of a plurality of inverter or converter units for supplying a common output circuit. The paralleling of the plurality of units is desirable in order to provide a sufficient power output to the common circuit, and, additionally, it is a highly desirable arrangement for supplying a critical load. When inverter or converter units are connected in parallel, it is essential that the common output be regulated so that the power outputs of each of the units are substantially balanced. If this is not the case, one of the units may supply power in excess of its rating while other of the parallel connected units may be operating at less than their capacity. If one of the units is permitted to supply excessive power, it may fail and cause other of the units, in turn, to supply excessive power and fail thereby causing the failure of the entire system. Thus, it would be highly desirable if each of the units could be so interconnected that the respective outputs of the individual units would be held within prescribed output limits. In the case when inverters are to be connected in parallel, an additional problem is introduced that of maintaining the phase relationship between respective inverter units so that the alternating outputs are provided in synchronism.

SUMMARY OF THE INVENTION

The present invention provides a power processing system wherein a plurality of processing units have their outputs commonly connected. Regulating control signals are provided indicative of the respective outputs of the units with regulating control singlas corresponding to the unit having the highest output being utilized to regulate the output of each of the units.

2

BRIEF DESCRIPTION OF THE DRAWING

FIG. 1 is a schematic-block diagram of one embodiment of the present invention utilizing inverter units; and
FIG. 2 is a schematic-lock diagram of another embodiment of the present invention utilizing converter units.

DESCRIPTION OF THE PREFERRED EMBODIMENTS

Referring to FIG. 1, processing units A, B and C are illustrated having their outputs connected in parallel. Only three units are shown, however, it should be understood that other units could be connected in parallel therewith. The units A, B and C, respectively, comprise an inverter IA and a regulator RA, and inverter IB and a regulator RB and an inverter IC and a regulator RC. Each of the inverters IA, IB and IC are supplied with a D.C. input Vdc from common terminals T1 and T2. The inverters IA, IB and IC are operative to invert the D.C. input Vdc into a three phase alternating output which appears at the output leads thereof. The inverters IA, IB or IC may, for example, comprise three phase, solid state inverters utilizing solid state switching devices, such as silicon controlled rectifiers, which are gated on in a predetermined fashion to build up the alternating output of the inverter by the selective switching of the D.C. input thereto. Such solid state inverter systems are well known in the art and are operative to provide an alternating output therefrom at a predetermined frequency and amplitude in response to the D.C. input and control inputs supplied thereto.

A master oscillator MO is provided and supplies its output to each of the inverters IA, IB and IC. The master oscillator MO controls the switching rate of the switching devices of each of the inverters, and since each of the inverters is commonly driven by the master oscillator therein respective outputs are held in phase and frequency synchronism.

The three outputs of the inverters IA, IB and IC are respectively coupled via contactors KA, KB and KC to three output buses B1, B2 and B3. The contactor KA includes three mechanically ganged contacts K1a, K2a and K3a. Contactors KB and KC, respectively, include contacts K1b, K2b and K3b and K1c, K2c and K3c. By the closing of the contactors KA, KB or KC, the respective inverter units A, B or C can be connected into the system. Thus, if desired only one, two or all three of the units can be utilized for supplying the common output buses B1, B2 and B3.

Regulators RA, RB and RC are respectively associated with each of the inverters IA, IB and IC and respectively provide regulating control signals at their control output terminals Ta1, Tb1 and Tc1 in response to the output of the associated inverter being applied to the input thereof. The amplitude of the regulating control signals, which may be a D.C. voltage, is indicative of the amplitude of the output of the associated inverter. The inverters IA, IB and IC are respectively provided with control input terminals Ta2, Tb2 and Tc2 at the control inputs thereof.

An error restrictor circuit is provided for supplying the regulating control output from the regulator RA, RB or RC having the highest magnitude, which is indicative of the fact that the associated inverter unit IA, IB or IC is supplying the highest output to all of the inverter units as the control input thereto.

The error restrictor circuit includes: a plurality of asymmetrical devices comprising diodes D$b$, D$ab$ and D$cb$ and diodes D$c$, D$ac$ and D$bc$ and relay contactors ERA, ERB and ERC. The relay contactors ERA, ERB and ERC each include two sets of contacts K4$a$ and K5$a$, K4$b$ and K5$b$ and K4$c$ and K5$c$, respectively. The contact pairs K4$a$–K5$a$, K4$b$–K5$b$ and K4$c$–K5$c$ are mechanically ganged to each other and also to the contacts of the contactors KA, KB and KC. Thus, when one of the inverter units IA, IB or IC is connected into the system the associated portion of the restrictor circuit is also connected into the system.

Assume that all of the inverter units A, B and C are in the system with the contactors KA, KB, KC closed and the associated relay contactors ERA, ERB and ERC closed. Also assume that the inverter IA is supplying the highest output voltage of the three inverters. Regulator RA will be supplying the highest regulating output voltage at its control output terminal T$a$1. The regulating output signals from the regulator RA are thus translated through the diode D$a$, which is connected from anode to cathode between the terminals T$a$1 and T$a$2, and is so poled to apply the regulating control signals to the control input of inverter IA as to regulate the output thereof. The regulating control output of the regulator RA is also supplied to the control input terminal T$b$2 of the inverter RB via contacts K4$a$, the diode D$ba$ and the contacts K5$b$, with the diode D$ab$ being so poled to translate the signal from the terminal T$a$1 to the terminal T$b$2. Thus, the inverter IB responding to the magnitude of the regulating control signals from the regulator RA will change its output voltage to correspond to the output voltage level of the inverter IA. Since it was previously assumed the regulating control output of the regulator RA is higher than the regulating control output of the regulator RB at its control output terminal T$b$1, the diode D$b$, which is connected from anode to cathode between the terminals T$b$1 and T$b$2, will be reverse biased with the voltage at its cathode at the terminal T$b$2 being higher than the voltage at its anode at the terminal T$b$1. Thus, the regulating control output of the regulator RB is blocked from being applied to the associated inverter IB. Similarly, the diode D$ba$, which is connected between the control output terminal T$b$1 of the regulator RB and the control input terminal T$a$B of the inverter IA via the contacts K4$b$ and K5$a$, will block the regulating control output of the regulator RB from being applied to the terminal T$a$2 in that the terminal T$a$2 is at a higher voltage due to the regulating control output of the regulator RA being applied thereto.

The regulating control output of the regulator RA is also applied to the control input terminal T$c$2 of the inverter IC via the contacts K4$a$, the diode D$ac$ and the contacts K5$c$, with the diode D$ac$ being so poled to translate the regulating control signals from the regulator RA therethrough so as to regulate the output of the inverter IC toward the magnitude of the output of the inverter IA. The regulating control output of the regulator RC at the control output terminal T$c$1 is blocked from being applied to the inverter IC by the diode D$c$ which is reverse biased in that the voltage applied to the cathode thereof is at substantially the regulating control output of the regulator RA and is higher than the regulating control output at the terminal T$c$1. The regulating control output of the regulator RC is also blocked from being applied to the inverter IA by the reverse biasing of the diode D$ca$ which is connected between the terminals T$c$1 and T$a$2 via contacts K4$c$ and K5$a$. The regulating control output of the regulator RA being applied to the cathode of the diode D$c$4 causes this diode to block the regulating control output of the regulator RC. Also the output of the regulator RC is blocked from being applied to the control input of the inverter IB by the reverse biasing of the diode D$cb$, which is connected between the terminals T$c$1 and T$b$2 by contacts K4$c$ and K5$b$, the cathode of the diode D$cb$ receiving the regulating control output of the regulator RA which is higher than the regulating control output of the regulator RC applied to the anode thereof. The diode D$bc$ connected between the terminal T$b$1 and the terminal T$c$2 via the contacts K4$b$ and K5$c$ serves to block the regulating control output of the regulator RB from being applied to the inverter IC in that the input control terminal T$c$2 is at the regulating control voltage of the regulator RA causes the cathode of the diode D$bc$ to be at a higher potential than its anode which is connected to the regulating control output of the regulator RB at the terminal T$b$1.

In summary, with the regulator RA providing the highest output at its regulating control output terminal T$a$1 and the regulators RB and RC providing lower outputs at their output terminals T$b$1 and T$c$1, respectively, the diodes D$a$, D$ab$ and D$ac$ are forward biased to translate the regulating control output of the regulator RA to the inverters IA, IB and IC, respectively. During the same time diodes D$b$, D$c$, D$bc$, D$ba$, D$cb$ and D$ca$ are reverse biased to block the passage of the regulating control output from the terminal T$b$1 of the regulator RB1 and the terminal T$c$1 of the regulator RC.

As another example, assume now that the inverter IB supplies an output larger than the inverters IA and IC. The regulating control output of the regulator RB at the terminal T$b$1 would be greater than the regulator outputs of the regulators RA and RC. In response to the higher output of the regulator RB at the control output terminal T$b$1, diodes D$b$, D$ba$ and D$bc$ now become forward biased to supply the regulating control output of the regulator RB to the inverters IB, IA and IC and to cause the outputs of the inverters to be driven toward the output of the inverter IB. Under these conditions diodes D$a$, D$c$, D$ab$, D$ac$, D$ca$ and D$cb$ would be reverse biased by the higher regulating control voltage appearing at the terminal T$b$1 being applied to the cathode electrodes thereof while lower regulating control voltages are applied to the anode electrodes thereof. This thereby prohibits translation of regulating control outputs from the regulators RA and RC.

The system of FIG. 1 thus operates so that each of the inverters IA, IB and IC receives regulating control inputs at their control inputs T$a$2, T$b$2 and T$c$2, respectively, so as to regulate the outputs thereof to the output of the inverter supplying the highest voltage output at that particular time. The total output of the system at the output buses B1, B2 and B3 are thus regulated within prescribed limits with the output of the individual inverters IA, IB and IC being substantially balanced and held within relatively close output limits.

If it is desired to drop one of the inverter units, for example, the unit B, from the system, this is possible without disrupting the common system output at the buses B1, B2 and B3. In order to drop the inverter unit B, it is only necessary to open the contactor KB which disconnects the output of the inverter IB from the common buses B1, B2 and B3. The opening of the contactor KB also causes the opening of the error restrictor contactor ERB causing contacts K4$b$ and K5$b$ to open thereby disconnecting diodes D$ba$, D$bc$, D$ab$ and D$cb$ from operation in the error restrictor circuit. However, it should be noted that if the contactors KA and KC remain closed so error restrictor relays ERA and ERC all remain closed so that diodes D$ca$ and D$ac$ interconnect the regulator and inverter of the inverter units A and C so that the system will operate as previously described even though the regulator unit B has been dropped from the system.

In FIG. 2, converters CA, CB and CC are utilized to replace the inverters IA, IB and IC, respectively, of FIG. 1. The converters CA, CB and CC are supplied via their input terminals T1 and T2 with, for example, an alternating voltage V$ac$ rather than the D.C. inputs V$ac$ as provided to the inverters IA, IB and IC. The converters CA, CB and CC are operative to convert the alternating input V$ac$ thereto into a D.C. output which is applied to the common bus lines B1 and B2 via contactors KA, KB and KC. Similar reference characters are utilized in FIG. 2 for elements performing the same function as those in FIG. 1.

The outputs of the converters CA, CB and CC are controllable in response to regulating control signals supplied to their respective regulating control input terminals T$a$2, T$b$2 and T$c$2. The converters CA, CB and CC may for example comprise power supplies which are responsive to regulating control signals to control the D.C. output therefrom and which are driven by an alternating current input. Each of the converter units A, B and C has associated therewith regulators RA, RB and RC which supply regulating control outputs at terminals T$a$1, T$b$1 and T$c$1, respectively, indicative of the magnitude of the output voltage of the associated converters CA, CB or CC.

The operation of the system of FIG. 2 is substantially the same as that of FIG. 1 with the error restrictor circuit operating identically with that of FIG. 1. Thus, for example, if the output of the converter CB is higher than the output of the converters CA and CC, the regulator RB will supply the highest regulating control output at its control output terminal T$b$1. This will cause the diodes D$b$, D$ba$ and D$bc$ to be forward biased to supply the regulating control output from the terminal T$b$1 to the control inputs of the converters CB, CA and CC, respectively. At the same time the diodes D$a$, D$c$, D$ab$, D$ac$, D$ca$ and D$cb$ are reverse biased prohibiting the regulating control outputs of the regulators RA and RC from being supplied to any of the control inputs of the converters CA, CB or CC.

It can thus be seen that the error restrictor circuit selects the highest regulating control output of the regulators RA, RB or RC to be applied to each of the converters CA, CB or CC so that the converters are regulated to the output of the highest output of the plurality of converters. With such an arrangement, the common output of the system at the buses B1 and B2 is maintained at a substantially constant value, while the outputs of the individual converters CA, CB and CC are substantially balanced with none of the converters being required to supply excessive power therefrom when other of the converters may be operating at less than capacity. As in the system of FIG. 1 any of the converter units A, B or C of FIG. 2 may be dropped from the system by the opening of the contactors KA, KB or KC without disrupting the system operation and with the corresponding error restrictor relays ERA, ERB or ERC opening to disconnect the portions of the error restrictor circuit corresponding to the dropped converter unit.

Although the present invention has been described with a certain degree of particularity, it should be understood that the present disclosure has been made only by way of example and that numerous changes in the details of construction and the combination and arrangement of parts, elements and components can be resorted to without departing from the spirit and the scope of the present invention.

I claim as my invention:

1. In a power processing system the combination of:
a plurality of processing means each comprising an inverter for inverting a DC input thereto to an AC output being controllable in response to regulating control signals applied thereto;
a plurality of regulating means, one being associated with each of said processing means, each of said regulating means being operative to provide at a control output thereof said regulating control signals in response to the output level of the associated of said processing means, said regulting control signals being operative to control the output level of each of said processing means when applied to a control input thereof;
means for applying the outputs of each of said processing means to a common output for the system;
master oscillating means for supplying driving signals to each of said inverters to maintain said plurality of inverters in synchronism; and
error restriction means for applying those regulating control signals from the regulating means associated with the processing means having the highest output level to each of said plurality of processing means to control the respective output level thereof and being operative to block the regulating control signals from the other of said regulating means.

2. In a power processing system the combination of:
a plurality of processing means for changing an input thereto in one condition to an output in another condition;
a plurality of regulating means, one being associated with each of said processing means, each of said regulating means being operative to provide at a control output thereof regulating control signals in response to the output level of the associated of said processing means, said regulating control signals being operative to control the output level of each of said processing means when applied to a control input thereof;
means for applying the outputs of each of said processing means to a common output for the system;
error restriction means for applying those regulating control signals from the regulating means associated with the processing means having the highest output level to each of said plurality of processing means to control the respective output level thereof and being operative to block the regulating control signals from the other of said regulating means;
said error restriction means includes:
first interconnecting means including an asymmetrical device connected between the control output and control input of the associated processing means and regulating means, and
second interconnecting means including a plurality of asymmetrical devices each respectively connecting the control output of each of said regulating means to the control input of the other of said plurality of processing means,
the asymmetrical device of said first interconnecting means which receives said those regulating control signals being so poled to translate them to the associated of said processing means,
the plurality of asymmetrical devices of said second interconnecting means receiving said those regulating control signals being so poled to translate them to the other of said processing means,
the asymmetrical devices of said first interconnecting means and said second interconnecting means not receiving said those regulating control signals being so poled to be blocked from translating by said those regulating control signals.

3. The combination of claim 2 wherein:
said plurality of processing means each comprises a converter for converting an AC input thereto to a DC output to be supplied to said common output and with the DC output of each of said converters being controllable in response to the regulating control signals applied thereto.

4. The combination of claim 3 wherein:
said plurality of processing means each comprises an inverter for inverting a DC input thereto to an AC output to be supplied to said common output and with the AC output being controllable in response to the regulating control signals applied thereto;
said combination further including:
master oscillating means for supplying driving signals to each of said inverters to maintain said plurality of inverters in synchronism.

5. The combination of claim 3 wherein:
said asymmetrical devices comprise diodes.

6. The combination of claim 4 wherein:
said asymmetrical devices comprise diodes.

References Cited

UNITED STATES PATENTS

| | | | |
|---|---|---|---|
| 1,654,505 | 12/1927 | Leonard | 307—58 |
| 1,714,656 | 5/1929 | Burgess et al. | 307—58 |
| 2,315,599 | 4/1943 | Cox et al. | 321—27X |
| 2,342,791 | 2/1944 | Cox | 321—27X |
| 2,668,919 | 2/1954 | Puchy | 307—82X |
| 2,742,579 | 4/1956 | Stevens et al. | 307—82X |
| 3,351,841 | 11/1967 | Lipman et al. | 307—82X |
| 3,447,063 | 5/1969 | Hammarlund | 321—27X |

FOREIGN PATENTS

| | | | |
|---|---|---|---|
| 771,997 | 4/1957 | Great Britain | 307—52 |

WILLIAM M. SHOOP, JR., Primary Examiner

U.S. Cl. X.R.

307—24, 58, 82; 321—27